Aug. 21, 1962 J. J. ZIMMERMANN 3,050,585

RECORDING AND REPRODUCING MECHANISM OF A TELEPHONE ANSWERING DEVICE

Filed May 12, 1958 2 Sheets-Sheet 1

INVENTOR.
JOSEPH J. ZIMMERMANN
BY C. R. Sipe
ATTY.

Aug. 21, 1962 J. J. ZIMMERMANN 3,050,585

RECORDING AND REPRODUCING MECHANISM OF A TELEPHONE ANSWERING DEVICE

Filed May 12, 1958 2 Sheets-Sheet 2

INVENTOR.
JOSEPH J. ZIMMERMANN

BY C. R. Sipe

ATTY.

United States Patent Office 3,050,585 Patented Aug. 21, 1962

3,050,585
RECORDING AND REPRODUCING MECHANISM OF A TELEPHONE ANSWERING DEVICE

Joseph J. Zimmermann, Milwaukee, Wis., assignor to Electronic Secretary Industries, Incorporated, Waukesha, Wis., a corporation of Wisconsin Filed May 12, 1958, Ser. No. 734,570
12 Claims. (Cl. 179—6)

The present invention pertains to telephone answering apparatus and particularly to a magnetic recording and reproducing mechanism for use in a compact, low cost answering unit.

In the conventional telephone answering unit, the ringing signal in a telephone line closes a circuit to actuate a phonograph or other reproducing mechanism to transmit a prerecorded message out over the telephone line to the calling party. At the end of the prerecorded message, power is switched, by timing means, a recorded tone on the record, or any other suitable means, to a recording unit. The recording unit then receives and records a message from the calling party over the telephone line which may subsequently be played back to the subscriber.

The conventional answering unit requires a duplication of many components such as motors, transport mechanisms, control circuits, timing motors, and switch over controls between the usual recording and reproducing mechanisms.

The answering and recording machine of the present invention eliminates the need for two separate units by placing a prerecorded record on the vertical or arcuate wall of a cylindrical turntable and receiving and recording the message from the calling party on an end or horizontal surface of the turntable. In this manner, a single turntable and motor is utilized and the mid-cycle shift from an outgoing message to the receipt of an incoming message is accomplished mechanically at the end of a predetermined amount of rotation of the turntable. Since only one turntable is used, all of the timing for the unit can be accomplished from the rotation of the turntable, thereby eliminating the need for intricate timing devices to regulate the incoming and outgoing operations.

It is a primary object of the present invention to provide a telephone answering device with a single transport means for carrying a prerecorded message and a message receiving means.

Another object of this invention is to provide a telephone answering device with a reproducing and recording means, both of which are constantly engaged, to transmit sound to or from a recording surface upon actuation of their transmitting circuits.

Another object of the present invention is to provide a telephone answering device with a mechanical control means for performing the mid-cycle shift function in response to a predetermined increment of movement of the transport means.

Still another object of this invention is to provide means actuated by the answer cycle to advance the recording head across the recording disk to record messages in separate concentric paths thereon.

Yet another object of the present invention is to provide indicating means controlled by the recording head position to indicate the number of messages which have been recorded on the answering device.

Another object of this invention is to provide a cam system operable in predetermined relationship to the turntable to control input and output portions of the answering cycle.

These and other objects of the invention will be apparent to one skilled in the art from the following detailed description when read in conjunction with the drawings, wherein.

Figure 1:
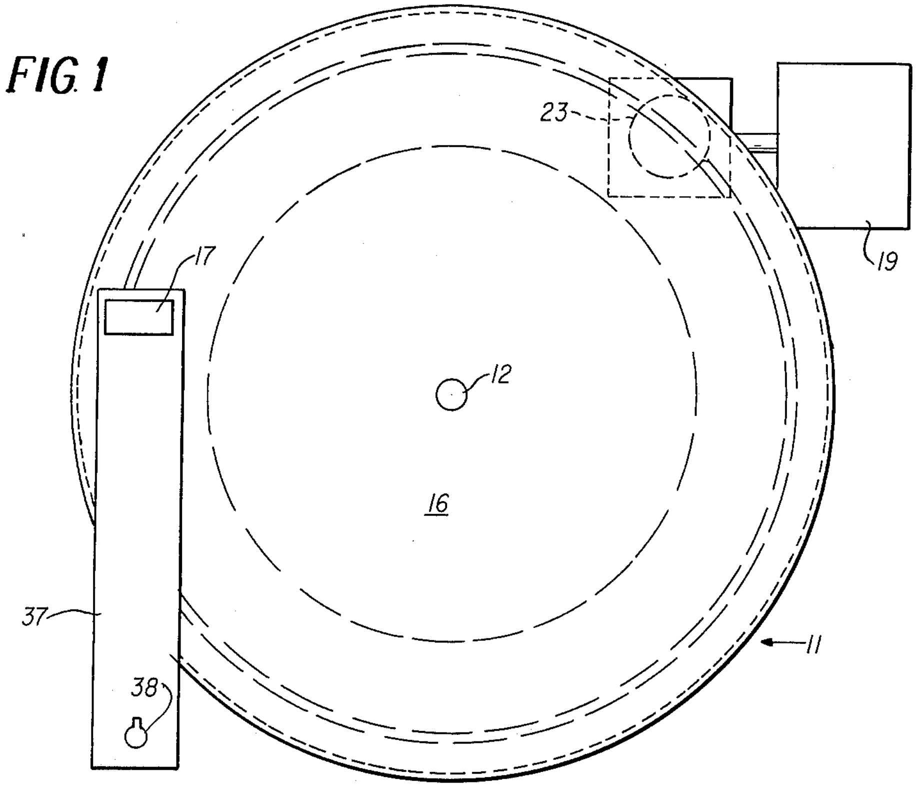
FIG. 1 is a plan view of an answering device embodying the present invention.

The answering device of this invention comprises a transport means including a flat cylindrical turntable 11 having a rotatable shaft 12 passed through its center of rotation and keyed for rotation by the rotation of the turntable. The cylindrical or vertical portion 13 of the turntable carries a prerecorded message thereon and has a reproducing means including a pick-up head 14 mounted adjacent thereto which is adapted to be activated, by means to be later described, for transmitting a message from the rim over a telephone line in response to a ringing current in the line.

The end or horizontal surface 16 of the turntable is adapted to carry a recording disk and has a recording means including a recording head 17 positioned adjacent thereto adapted to be activated to receive and record a message on the disk from the calling party after the turntable has completed one revolution.

The turntable 11 may be rotated by any suitable means such as the motivating unit indicated generally at 18 which includes an A.C. motor 19, a gear reduction unit 21 which transmits power from the motor 19 through a shaft 22 to a drivewheel 23 to rotate the cylinder 11 at a predetermined rate, which in the present example is four revolutions per minute.

The shaft 12 is suitably journaled, such as in the bearing indicated generally at 24, for support of and rotation with the turntable 11 and has a driving gear or pinion 26 keyed at its lower end for rotation therewith. A cam system indicated generally at 27 is associated with the shaft 12 through the pinion 26 for rotation in timed relationship to the rotation of the turntable 11. The cam system 27 includes a cam shaft 28 suitably journaled in a bearing 29 with a gear 31 keyed to the shaft 28 and engaged with the pinion 26, the gear 31 being of a proper proportion to the pinion 26 to impart the desired rotation to the cam shaft 28 relative to the rotation to the turntable 11. A motor control cam 32, a mid-cycle shift cam 33, and a ratchet relay activator cam 34 are keyed to the cam shaft 28 for rotation therewith in response to its motivation by the rotation of the turntable. The cam 32 is shaped to close a contact means to maintain energy to the motor throughout the entire answering cycle, while the cam 33 is shaped to close a contact means to effect the mid-cycle shift through a circuit to be subsequently described.

Figure 2:
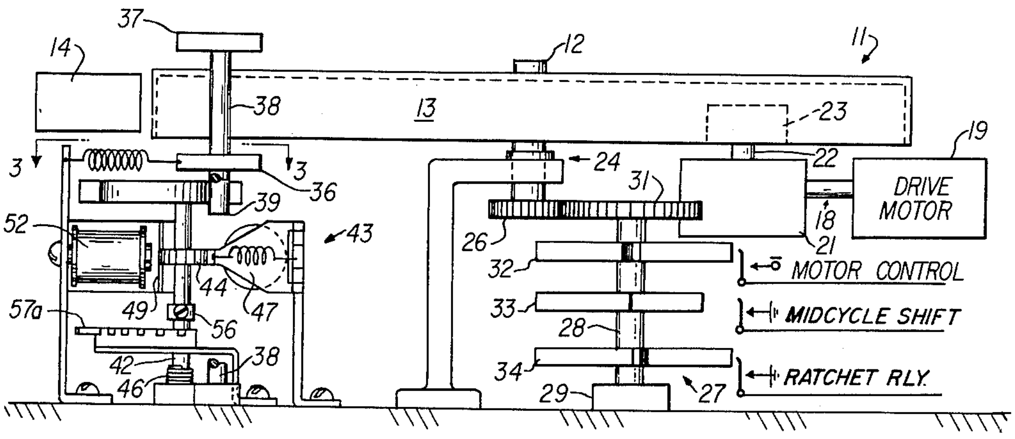
FIG. 2 is a front elevational view of an answering device embodying the present invention.
Figure 4:
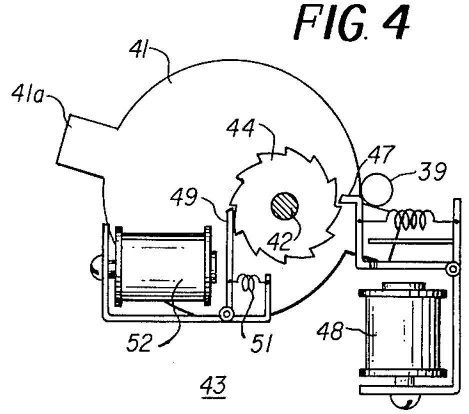
FIG. 4 is an enlarged detail view of the motivating ratchet-cam mechanism.
Figure 3:
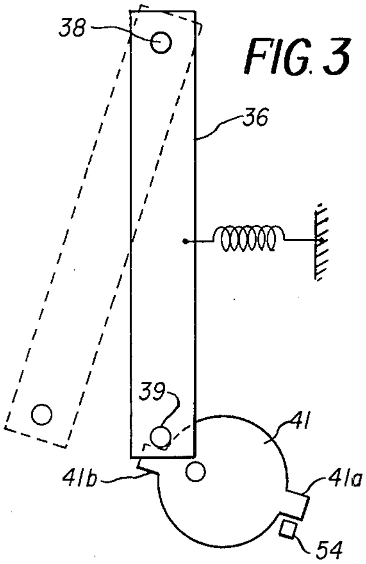
FIG. 3 is a partial plan view taken along the line 3—3 in FIG. 2 illustrating the positioning device for the tone arm of this invention.

The head 17 which is used to impress a message on the disk 16 is supported on a tone arm 37 for movement to a predetermined number of concentric recording paths rather than following the conventional continuing helical recording path. The tone arm mechanism, as is most clearly seen in FIGS. 1 and 2, includes the tone arm 37 and a follower arm 36 which are keyed to a pivotally mounted pin 38. The follower arm 36 has a follower pin 39 at the outer end thereof (FIG. 3) which is pressed against a ratcheting cam 41 by a spring attached to the arm so that the position of the follower arm 36 and the tone arm 37 is controlled by the position of the cam 41. The cam 41 is rotated about an eccentrically mounted pin 42 in incremental steps by a ratchet means generally indicated at 43 which includes a ratchet wheel 44 keyed to the pin 42 and normally urged to rotate in a counter-clockwise direction (as viewed in FIG. 4) by a helical spring 46. The ratchet wheel 44 is stepped in a clockwise direction by stepping pawl 47 in response to the energization of the stepping relay 48 and is maintained against counterclockwise rotation by means of a detent 49 which is urged into engagement with the wheel by a spring 51 and which has associated therewith a reset relay 52 for selective release of the ratchet to return the ratchet cam 41 to its home position.

In the incremental motivation of the tone arm, the home position is established by the position of the cam 41 when a cam extension 41a is resting against a stop 54. Following the first reproducing cycle, the relay 48 is energized by any suitable means such as the closure of a contact by the cam 34 to pivot the pawl 47 into engagement of the cam 34 out of engagement with the contact wheel 44 and its associated cam 41 one step in a clockwise (FIG. 4) direction in which position it will be held by the detent 49 upon release of the relay 48 by movement of the cam 34 out of engagement with the contact 34a. Rotation of the cam 41 moves the tone arm 37 through the follower pin 39 and follower arm 36 one step towards the center of the disk 16 and positions the recording head 17 preparatory to impressing a new message in a new concentric path. The above-described procedure is repeated a predetermined number of times—in the present example 10—until the cam 41 has rotated sufficiently about its pin 42 to move the tone arm to the innermost concentric path, The machine must be manually reset by energizing the reset relay 52 to pull up the armature detent 49 to release the cam 41 for return to its home position by the spring 46. As the cam 41 reaches its home position, the extension 41a rests on the stop 54 ready for subsequent operation as described above.

Figure 6:
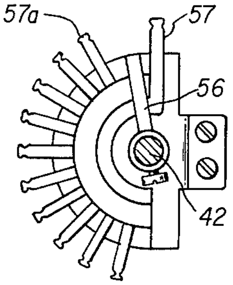
FIG. 6 is a detail of a rotary switch which is utilized in this embodiment to indicate position of the tone arm.

An additional feature which may be incorporated in the present device is a message indicator which gives immediate visual indication to the subscriber of the number of messages which have been received in his absence. A contact arm 56 is keyed to the cam rotating pin 42 (FIG. 6) for rotation therewith. As the pin 42 and its associated cam 44 is stepped to each subsequent recording position, the contact arm moves a predetermined distance to complete a circuit through a common contact 57 to one of a series of individual contacts 57a to a plurality of indicating lights L to indicate the position of the cam 44 and hence its associated tone arm.

Figure 5:
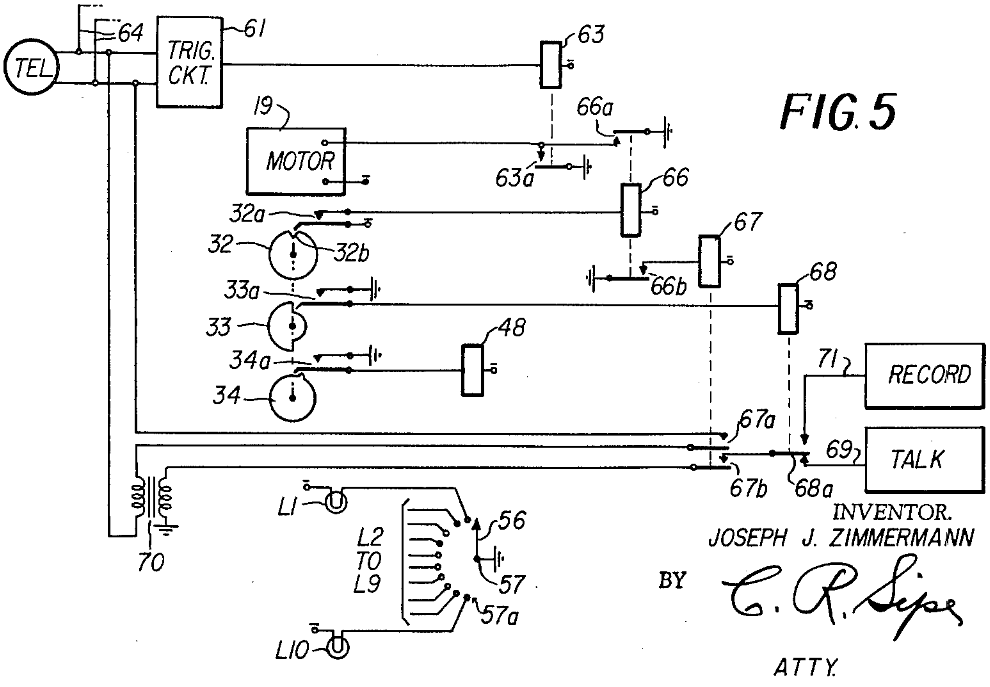
FIG. 5 is a schematic circuit diagram illustrating the control circuit of this invention.

Referring now to FIG. 5, the control circuit for the answering device of this invention includes a trigger circuit 61 for energizing a start relay 63 in response to a ringing current in a pair of telephone lines 64 to draw up a make contact 63a associated with the start relay 63 to complete an operating circuit through the motor 19. The triggering circuit 61 is of a conventional type, an example of which is fully described in applicant's copending application Serial No. 600,002, filed July 25, 1956. The motor 19, through mechanisms above-described, rotates a cam shaft 28 to impart rotary motion to the cams 32, 33, and 34 each of which has associated therewith a normally open contact 32a, 33a, 34a respectively. Closing of the contact 32a provides operating current to a relay 66. The relay 66 has a make contact 66a in an operating circuit for the motor 19 and a make contact 66b in an operating circuit for a line load relay 67. The function of the line load relay 67 is to close the telephone line circuit and to complete a circuit from the recording or reproducing means through a transformer 70 to the telephone line. This function is accomplished by drawing up the make contacts 67a and 67b. The closing of contacts 67a also causes the central office to stop the ringing signals in known manner. While the reproducing and recording means of this invention are indicated schematically in FIG. 2 as blocks; it is of course understood that each of the units includes the conventional components of such instruments, examples of which are described in the above-mentioned copending patent, Serial No. 600,002.

Control between the outgoing or reproducing head and the incoming or recording head is effected by the cam 33 rather than by the recorder as in units which were heretofore used. This cam closes a make contact 33a midway in the answering cycle to effect the mid-cycle shift to disconnect the reproducing head 14 from the telephone line and connect the recording means thereto to receive a message from the calling party. This switch is accomplished upon closure of the contact 33a to energize a shift relay 68 to move a contact spring 68a from its normal position in engagement with a break contact 69 connected to the reproducing unit into engagement with a make contact 71 connected to the recording unit. Engagement of the contact spring 68a with the make contact 71 completes a circuit from the recording unit through the contact 67a to the transformer 70 for connection with the telephone line.

The cam 34 has associated therewith a contact 34a, closure of which applies operating current to the ratchet relay 48 as described above. The positions of the contacts 33a and 34a are such that the contact 34a will be momentarily closed at the beginning of the answering cycle, or during the recording portion of the cycle.

In operation, the answering device, being in a standby condition, is activated in response to a ringing current in the telephone line 64 through the triggering circuit 61 to energize the relay 63. Energization of the relay 63 closes the make contact 63a to complete a temporary operating circuit for the motor 19. Operation of the motor 19 imparts rotary motion to the cam shaft 28, through the turntable shaft 19 and the gears 26 and 31, to cam a contact arm out of the cam slot 32b to close the make contact 32a to complete an operating circuit to the relay 66. Operation of the relay 66, draws up the make contact 66a to complete an operating circuit for the motor 19 for the duration of one revolution of the cam 32 or, in this example, two revolutions of the turntable 11. Further, operation of the relay 66 closes the make contact 66b to provide operating current to the line load relay 67 to close the make contact 67a and complete a circuit from the reproducing device or answer head through the transformer to the telephone line 64. Since the turntable 11 is already moving, the prerecorded message on the cylindrical edge thereof is transmitted by the reproducing device across the line and gives the message to the calling party. At the beginning of the reproducing cycle, the cam 34 progresses far enough to engage the contact 34a to complete an operating circuit for the ratchet relay 48 to rotate the cam 41 to move the tone arm 37 into its first recording position as described above. After the turntable has made one complete revolution and has transmitted the complete message recorded on its periphery, the cam 33 engages the contact 33a and closes it to complete an operating circuit for the relay 68. Operation of the relay 68 moves the blade 68a from the break contact leading to conductor 69 to the make contact leading to conductor 71 thereby connecting the recording device to the line circuit. A calling party then has one revolution of the turntable to transmit his message across the telephone line and have it impressed on the disk 16 by the recording unit. At the end of the second revolution of the turntable, the blade of contact 32a drops once more into the cam slot 32b in the cam 32 to break the operating circuit to the relay 66 thereby opening the contacts 66a and 66b to interrupt the operating circuits for the motor and for the line load relay 67 to open the contacts 67a and 67b thereby removing the recording and reproducing apparatus from the telephone line and returning the answering apparatus and telephone line to a standby position. At the end of the second revolution of the turntable 11, the cam 33 will have revolved out of engagement with the contact 33*a* to remove operating current from the relay 68 to allow the contacts blade 68*a* to return to the break contact leading to conductor 69 in the recording unit to condition the reproducing device for transmission over the telephone line upon subsequent actuation of the line load relay 67.

While the present invention has been described in a particular embodiment, it is, of course, understood that changes may be made in the form or structure thereof without departure from the spirit and scope of the invention.

What is claimed is:

1. In a telephone answering machine connected to a telephone line: a cylindrical turntable having a recording surface on the arcuate wall thereof and on at least one end wall thereof; reproducing means engaged with the arcuate portion of said cylinder operable to transmit a prerecorded message from said surface to said telephone line; recording means engaged with the end wall of said cylinder operable to record a message from said telephone line on said surface; driving means for rotating said turntable; and means controlled by the rotation of said turntable for sequentially activating said reproducing means and said recording means.

2. In a telephone answering machine connected to a telephone line: a cylindrical turntable having a prerecorded message on the side wall thereof and a sound recording disk on one end; reproducing means engaged with the side wall of said turntable; recording means engaged with the recording disk on the end of said turntable; driving means for rotating said turntable, said means including an actuating circuit operable by ringing current in the telephone line for starting said driving means; cam means operated by rotation of said turntable for sequentially actuating said reproducing means and said recording means; and circuit means operated by a predetermined amount of rotation of said turntable to return said telephone line and said answering machine to a normal standby condition at the end of an answer cycle.

3. In a telephone answering device connected to a telephone line: a cylindrical turntable having a recorded message impressed on the side wall thereof and a sound recording disk on one end; first transmitting means including a constantly engaged pickup head operable to transmit a recorded message from the side wall of said turntable to said telephone line; second transmitting means including a recording head constantly engaged with the recording disk operable to impress sounds from said telephone line on said disk; driving means actuated by a ringing current in the telephone line for rotating said turntable at a predetermined speed about a center shaft; a relay circuit actuated by initial movement of said turntable for connecting said first transmitting means to said telephone line; means operable by a predetermined amount of rotation of said turntable to disconnect said first transmitting means from said circuit and connect said second transmitting means thereto; and means controlled by said turntable for disconnecting said circuit from said telephone line at the end of a predetermined amount of rotation of said turntable.

4. In a telephone answering device which is actuated for an answering cycle by a ringing signal in a telephone line to simulate normal answering conditions in the telephone and activate a reproducing means, including a pickup head, to transmit a prerecorded message over said telephone line, and has a recording unit including a tone arm operable to impress a message from said telephone line in a circular path on a recording surface, in combination: a cylindrical turntable having a prerecorded message positioned on the arcuate wall and a recording surface on at least one end, said arcuate wall and recording surface being in constant engagement with said pickup head and said tone arm respectively; a motor actuated by a ringing signal in the telephone line to rotate said turntable; first cam means motivated by rotation of said turntable to electrically disconnect said reproducing means from said telephone line and connect said recording means thereto; and second cam means actuated by a predetermined amount of rotation of said turntable for moving the tone arm of said recording means a predetermined radial distance on said recording surface to condition it for the subsequent answering cycle.

5. In a telephone answering device for initiating an answering cycle in response to ringing current in a telephone line to transmit a prerecorded message to the calling party and record a message from the calling party: a cylindrical turntable having a recording surface on the arcuate wall and on at least one end wall thereof; means activated by initiation of said answering cycle for driving said turntable; means engaged with the arcuate portion of said turntable operable to transmit a prerecorded message from said turntable to said telephone line; means engaged with the end surface of said turntable operable to receive a message from said telephone line and record it on said recording surface; a circuit, including a transfer contact, for selectively connecting said reproducing and recording means to said telephone line; means operated by rotation of said turntable for positioning said transfer contact to electrically connect said reproducing means to said telephone line during a first predetermined increment of movement of said turntable and connecting said recording means to said telephone line during a second predetermined portion of said cycle.

6. In an automatic telephone answering and message recording apparatus including an answering circuit operated by ringing current in a telephone line for actuating an answering cycle, a message recording mechanism, comprising: a rotatably mounted circular turntable; a recording disk positioned for rotation with said turntable; recording means actuated at a predetermined point in said answering cycle to transmit sound signals from said telephone line to said recording disk, said recording means including a tone arm pivotally mounted at one end and having its free end positioned for impressing the sound signals from said recording means in a circular path on said recording surface; and means actuated by a predetermined amount of rotation of said turntable for repositioning the free end of said tone arm a predetermined radial distance towards the center of said turntable at the end of each answering cycle, whereby the incoming messages are sequentially impressed in a series of concentric circular paths on said recording surface.

7. In a telephone answering device, means for recording a plurality of messages from a telephone line on a recording surface, each in one of a plurality of unconnected paths, comprising: transport means for moving a recording surface in a predetermined path; recording means associated with said transport means, said recording means including a tone arm pivotally secured at one end, a recording head at the free end of said tone arm engaged with said recording surface, and a circuit operable to transmit sound signals from a telephone line to said recording head; means engaged with said tone arm to control the position of said recording head on said recording surface; and stepping means controlled by a predetermined increment of movement of said transport means for sequentially moving said positioning means along a finite radial path to a series of predetermined positions.

8. In a telephone answering device, a recording and reproducing machine comprising: a cylinder having two recording surfaces, one being cylindrical and the other being flat; recording means engaged with one of said surfaces; reproducing means engaged with the other of said surfaces; means for rotating said cylinder; and means to selectively actuate said recording means or said reproducing means to record on or reproduce from their respective engaged surfaces.

9. In a telephone answering device, a recording and reproducing machine comprising: a cylinder having two recording surfaces, one being cylindrical and the other being flat; recording means engaged with one of said surfaces; reproducing means engaged with the other of said surfaces; means for rotating said cylinder; means to actuate said reproducing means to transmit audio intelligence from said recording surface to said telephone line; and switch means operated by a predetermined amount of rotation of said cylinder to render said reproducing means ineffective and actuate said recording means to impress audio intelligence on its engaged surface.

10. In a telephone answering machine, a recording device comprising: a disc of recording material revolved at a constant speed about its geometric center; recording means fixedly positioned in engagement with said disc to impress audio intelligence thereon in a circular pattern during one revolution of said disc; means actuated by the completion of a revolution by said disc to move said recording means to a new fixed position a predetermined finite distance along a radius of said disc from said first path, whereby a plurality of messages are recorded on said recording surfaces in a plurality of concentric circular paths.

11. In a telephone answering device, means for recording a plurality of messages from a telephone line in a plurality of concentric circular paths on a recording surface comprising: a circular recording surface rotated about its geometric center; recording means fixedly engaged with said recording surface; means controlled by the rotation of said disc to actuate said recording means to impress audio intelligence from said telephone line onto said recording surface; means controlled by the rotation of said disc to render said recording means ineffective; means actuated by a predetermined rotation of said disc to step said recording means to one of a plurality of radial positions on said recording surface; means controlled by each incremental movement of said recording means to indicate the cumulative number of incremental steps; and means controlled by said indicating means to prevent further operation of said recording means after a predetermined number of movements thereof.

12. In a telephone answering device connected to a telephone line, a single turntable including a cylindrical surface having a pre-recorded message thereon and a flat surface adapted to record messages thereon, reproducing means including a pick-up head to reproduce said pre-recorded message from said cylindrical surface for transmission to said telephone line, recording means including a recording head for recording incoming messages on said flat surface received over said telephone line, a normally open first circuit to said reproducing means for transmitting said pre-recorded message to said telephone line, a normally open second circuit to said recording means for the transmission thereto of said incoming messages received over said telephone line, a motor having a drive shaft for rotating said turntable, an answer circuit in said device operated in response to receipt of ringing current over said telephone line for actuating said motor to rotate said turntable, whereby said cylindrical and flat surfaces are moved past said pick-up and recording heads respectively, means operated in response to said rotation of said turntable for loading said telephone line and for closing said first circuit to actuate said reproducing means, and means operated in response to a predetermined rotation of said turntable for opening said first circuit to disconnect said reproducing means and for closing said second circuit to connect said recording means.

References Cited in the file of this patent

UNITED STATES PATENTS

| | | |
|---|---|---|
| 2,380,799 | Shively et al. | July 31, 1945 |
| 2,519,568 | Handschin | Aug. 22, 1950 |
| 2,737,646 | Muffly | Mar. 6, 1956 |
| 2,784,254 | Lane | Mar. 5, 1957 |
| 2,835,737 | Shively | May 20, 1958 |
| 2,936,336 | Cooke et al. | May 10, 1960 |